W. H. OVERMOYER.
TIRE.
APPLICATION FILED FEB. 4, 1915.

1,187,379.

Patented June 13, 1916.

Witnesses
Einar Larson
Emily F. Camp

Inventor
William H. Overmoyer
By
Attorneys.

UNITED STATES PATENT OFFICE.

WILLIAM H. OVERMOYER, OF ROSELAWN, INDIANA.

TIRE.

1,187,379.  Specification of Letters Patent.  Patented June 13, 1916.

Application filed February 4, 1915. Serial No. 6,084.

*To all whom it may concern:*

Be it known that I, WILLIAM H. OVERMOYER, a citizen of the United States, residing at Roselawn, in the county of Newton and State of Indiana, have invented certain new and useful Improvements in Tires, of which the following is a specification.

This invention relates to resilient tires, and its object is to provide a simple and highly efficient tire of this kind which can be readily attached to any ordinary wheel, and in which the cushioning effect is obtained without the use of an inflatable air tube.

The herein stated object is attained by means of a novel combination and arrangement of parts to be hereinafter described and claimed, reference being had to the accompanying drawing in which—

Figure 1:
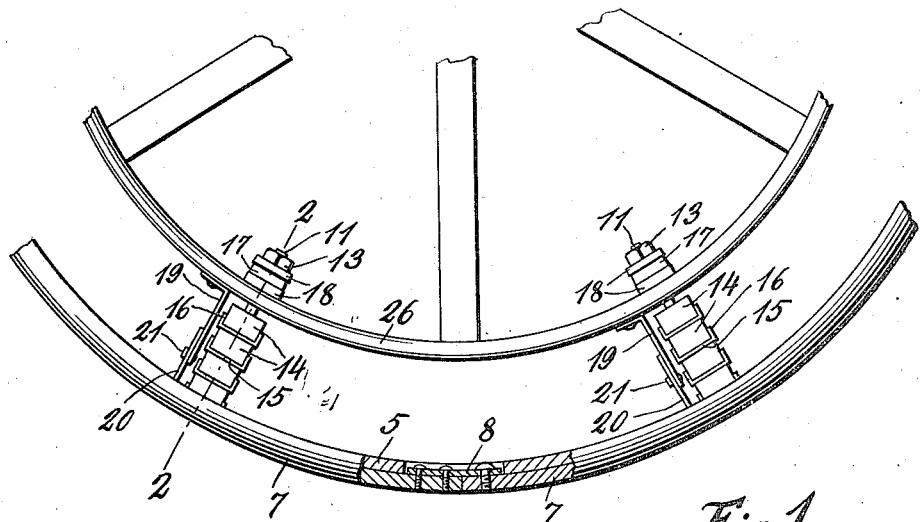
Figure 2:
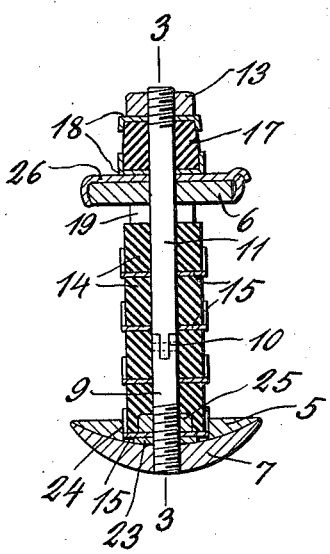
Figure 3:
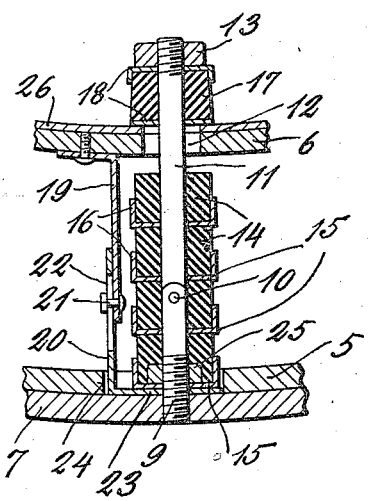

Figure 1 is an elevation partly in section of a fragment of the tire; Fig. 2 is a cross-section on the line 2—2 of Fig. 1, and Fig. 3 is a cross-section on the line 3—3 of Fig. 2.

Referring specifically to the drawing, the tire comprises spaced concentric rings 5 and 6, respectively, between which are interposed the cushioning elements to be presently described. The outer ring 5 is curved in cross-section at its outer surface, on which surface is mounted a tread 7 which is a spring steel ring, curved in cross-section. The tread may be in two semi-circular sections which are suitably connected end to end as shown at 8. The ring 5 may be of wood. The inner ring 6 is flat in cross-section.

Between the rings 5 and 6, at regular intervals, are mounted cushioning elements. Each of these elements is constructed and arranged as follows: In a tapped bore in the tread 7 is screwed a short stem 9 which extends inward, and has pivotally connected to its inner end, as indicated at 10, a stem 11 which passes through a slot 12 in the ring 6 and projects inwardly therefrom, its projecting ends being threaded to receive a nut 13. On the stems 9 and 11, between the rings 5 and 6, are mounted cushioning members in the form of rubber blocks 14 between which are located washers 15 having opposite outstanding marginal flanges 16 engaging the corresponding sides of the rubber blocks. Between the nut 13 and the inner surface of the rim 26 is also located a rubber block 17, the same being mounted on the projecting end of the stem 11 and between said nut and block is placed a washer 18 similar to the washers 15. A washer 18 is also located at the base of the block.

To the ring 6 is secured a link 19 which has a sliding connection with a link 20 carried by the tread 7. The link 19 has a stud 21 at its outer end which works in a slot 22 in the link 20. The outer end of the link 20 has a lateral bend 23 which seats in a recess 24 in the ring 5, through which bend the stem 9 passes. The rubber block 14 which is next to the ring 5 has a recess in which seats a nut 25 screwed on the stem 9, the washer 15 of this block being located between the block and the bend 23 of the link 20. Thus the nut secures the link 20, the bend of the latter being clamped between the washer and the inner surface of the tread 7. The links 19 and 20 extend transversely between the rings 5 and 6, and serve, in connection with the block 17, to limit the spread of said rings. The purpose of the washers 15 and 18 is to prevent the rubber blocks from cracking or flattening when in action. The block 17 is slightly tapered in the direction of its inner end. The pivotal connection between the stems 9 and 11, and the slot 12 allow sidewise flexure of the cushioning element when the wheel receives a severe shock, and as the stem 11 is not positively connected to the inner rings 6, it is not subjected to shock or strain. The rubber block next to the ring 6 is slightly spaced therefrom when the wheel is not loaded, but under a load said parts come together and the shock is transmitted to the other blocks of the series, and a cushioning effect is obtained. The block 17 serves as a cushion between the inner ring 6 and the nut or abutment 13 on the outer end of the stem 11.

The tire hereinbefore described can be applied to the rim 26 of any ordinary wheel, to which it may be made fast in any suitable manner. The links 19 and 20 are resilient, they being composed of spring steel, and their object is to normally keep the stems 11 in the center of the slots 12. There is thus provided a check for the flexible connection, which it is necessary to have between the rings 5 and 6, and a means of replacing the parts which have been flexed from weight or shock.

I claim:

A tire comprising spaced inner and outer rings, the outer ring having a tread, stems rigidly secured to the outer ring and having hinged stems extending inwardly through the inner ring, said inner ring having openings through which the hinged stems loosely pass, cushioning members mounted on the stems between the rings, links extending radially between the rings, said links being arranged in pairs, the members of which are secured respectively at their outer ends to the rings and have a sliding connection with each other, the outer ring having recesses in its inner surface, and the links which are adjacent to said ring having lateral bends seating in said recesses, through which bends the stems which are connected to the ring pass, and nuts secured on said stems against the bends.

In testimony whereof I affix my signature in presence of two witnesses.

WILLIAM H. OVERMOYER.

Witnesses:
S. J. LEHRER,
H. G. BATCHELOR.